United States Patent [19]

Iwasa et al.

[11] 3,843,788

[45] Oct. 22, 1974

[54] ANTI-PEPTIC ULCER SUBSTANCE FROM CORYDALIS TUBERS

[75] Inventors: Junzo Iwasa, Kyoto; Shunsuke Naruto; Noboru Ikeda, both of Osaka; Keiji Nakamura, Amagasaki; Yukinobu Sohji, Neyagawa, all of Japan

[73] Assignee: Dainippon Pharmaceutical Co., Ltd., Osaka, Japan

[22] Filed: Oct. 5, 1972

[21] Appl. No.: 295,163

Related U.S. Application Data

[63] Continuation of Ser. No. 62,632, Aug. 10, 1970, abandoned, which is a continuation-in-part of Ser. No. 735,162, June 7, 1968, abandoned, which is a continuation-in-part of Ser. No. 649,103, June 27, 1967, abandoned, which is a continuation-in-part of Ser. No. 493,267, Oct. 5, 1965, abandoned.

[30] Foreign Application Priority Data

Oct. 20, 1964   Japan.............................. 39-059633

[52] U.S. Cl. .................................................. 424/195
[51] Int. Cl. ............................................. A61k 27/14
[58] Field of Search ..................................... 424/195

[56] References Cited
OTHER PUBLICATIONS

Evers, "The Chemistry of Drugs," pp. 124–127, London: Ernest Benn Limited, (1926).

Merck's 1907 Index, (3rd Ed.), p. 159, published by Merck & Co. N.Y.

*Primary Examiner*—Sam Rosen
*Attorney, Agent, or Firm*—Clelle W. Upchurch

[57] ABSTRACT

A method of treating peptic ulcers by oral administration of an active substance from Corydalis tubers, preferably *Corydalis bulbosa* D.C., or dehydrocorydaline, compositions therefor and processes for the preparation thereof.

2 Claims, No Drawings

ANTI-PEPTIC ULCER SUBSTANCE FROM CORYDALIS TUBERS

RELATION TO OTHER APPLICATIONS

This is a continuation of application Ser. No. 62,632, filed Aug. 10, 1970 which is a continuation-in-part of application Ser. No. 735,162, filed on June 7, 1968 which is, in turn, a continuation-in-part of application Ser. No. 649,103, filed on June 27, 1967 which is, in turn, a continuation-in-part of application Ser. No. 493,267, filed on Oct. 5, 1965 all now abandoned.

BRIEF SUMMARY OF THE INVENTION

This invention relates to a new therapeutic method for the treatment of peptic ulcers and new pharmaceutical compositions therefor and methods for the preparation thereof.

More particularly, it relates to a method for the treatment of peptic ulcers by administering an active substance from the tuber of Corydalis genus or dehydrocorydaline, also to pharmaceutical compositions suitable for such treatment and processes for the preparation of the said active substance and dehydrocorydaline.

Some kinds of the tuber of Corydalis genus have been called "Yanhusuo" in China, Engosaku" in Japan and "Corydalis tuber" in Europe. They have been used as an important medicament as analgesic and antispasmodic in Chinese Medicine and in Homeopathic therapeutics. Also it was a home remedy in folk medicine in various parts of the world. However, heretofore no one has discovered that a substance extracted from the tuber of Corydalis genus and dehydrocorydaline which is a main active component of the said substance are particularly useful in the treatment of gastric ulcers.

The present invention results from a study of the tuber of Corydalis genus. It has now been discovered that the tuber of Corydalis genus includes an anti-peptic ulcer active substance, and then the processes of preparing this product at low cost have been discovered too.

The tuber of Corydalis genus of the present invention is a tuber of a plant belonging to the genus Corydalis, including *Corydalis bulbosa D.C.*, *Corydalis bulbosa D.C. var. typica Regel*, *Corydalis ambigua Cham. et Schlecht.*, *Corydalis aurea Will.*, *Corydalis Nakaii Ishidoya*, *Corydalis decunbens Pers.*, *Corydalis remota Fisch. var. genuina Maxim.*, *Corydalis ambigua Cham. et Schlecht. var. amurensis Maxim.* and *Corydalis tuberosa D.C.* Among these varieties, *Corydalis bulbosa D.C.*, *Corydalis ambigua Cham. et Schlecht.*, *Corydalis ambigua Cham. et Schlecht. var. amurensis Maxim.* and *Corydalis tuberosa D.C.*, more particularly, *Corydalis bulbosa D.C.* and *Corydalis ambigua Cham. et Schlecht.* are preferred. These tubers contain a large amount of alkaloid, more particularly dehydrocorydaline.

*Corydalis bulbosa D.C.* and *Corydalis ambigua Cham. et Schlecht.* are called "Chinese Corydalis." The commercial article, however, may include tubers of other varieties.

One object of the present invention is to provide the medical profession with an improved method of treating peptic ulcers by the administration of an active therapeutic substance extracted from Corydalis tubers and dehydrocorydaline.

Another object of the present invention is to provide therapeutic compositions suitable for the aforesaid method of treatment.

Another object of the present invention is to provide a process for the formulation of the aforesaid therapeutic composition.

A further object of the present invention is to provide a substance containing anti-peptic ulcer active principles from the aforesaid tube of Corydalis genus.

A still further object is to provide processes for the preparation of the aforesaid active substance and dehydrocorydaline.

According to the present invention, it has been found that the substance from the tuber of Corydalis genus and dehydrocorydaline produced a strong anti-ulcer activity which was clinically proved later. Furthermore, no remarkable side effect, generally induced by cholinolytic drugs, was encountered.

Although the principal ingredient of the said strong action is believed to be dehydrocorydaline, the active substance of the invention apparently contains also tertiary bases such as tetrahydropalmatine, protopine and the like, which enhance the anti-ulcer activity. The present active substance from Corydalis tubers and dehydrocorydaline possess superior anti-ulcer activity without any anti-cholinergic activity. The mechanism of the activity may be due to a sympathetic action. The activity was experimentally confirmed by suppression of gastric secretion, excretion of pepsin and augmented intestinal motility.

DETAILED DESCRIPTION OF THE INVENTION

The active substance of the invention is obtained by the following procedure. A tuber of Corydalis genus is repeatedly extracted with a solvent including water, a lower alcohol such as methanol, ethanol and propanol, or mixtures thereof. The combined extract is concentrated by evaporation under reduced pressure and the concentrated extract is acidified to a pH value between 1 and 4 by addition of dilute organic or mineral acid, such as acetic, tartaric, citric, hydrochloric, hydrobromic or sulphuric acid. The fat present in the aqueous solution is removed by extracting with a hydrocarbon solvent such as the so-called petroleum ether or petroleum benzin. The defatted acidic layer is made alkaline to a pH value between 7.5 and 12, preferably between 9 and 10, with ammonia, alkali metal hydroxide such as sodium hydroxide and potassium hydroxide, alkali metal carbonate such as sodium carbonate and potassium carbonate or alkali metal bicarbonate such as sodium bicarbonate and potassium bicarbonate. The resulting precipitate is filtered off from the defatted alkaline solution and the filtrate is extracted with a halogenated hydrocarbon such as chloroform, dichloromethane, trichloroethane and carbon tetrachloride. Being separated from the mixture and then being preferably acidified or neutralized with alcoholic hydrogen chloride, the halogenated hydrocarbon layer is evaporated to dryness under reduced pressure to give an active fraction A.

The active substance may be also prepared by direct extraction from the defatted alkaline solution with the halogenated hydrocarbon above-mentioned without filtration step. The active fraction obtained in this way is designated fraction B.

Each of the fractions A and B thus obtained possesses strong anti-ulcer properties and is valuable for clinical use, as shown below.

The dehydrocorydaline used in the present invention may be in a form of its salts such as mineral acid salts, e.g., chloride, bromide, iodide, nitrate or sulphate or organic acid salts, e.g., tannate, glycyrrhizate, anisate, gallate, benzilate, D-glucuronate or citrate having the following formula:

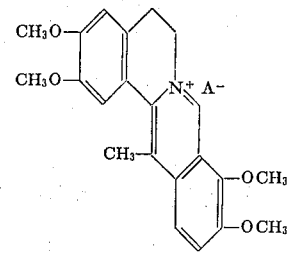

(I)

wherein A⁻ is an anion.

This compound may be prepared by extracting from tubers of Corydalis genus, but may be more commercially prepared by a synthetic method, i.e., by the following procedure.

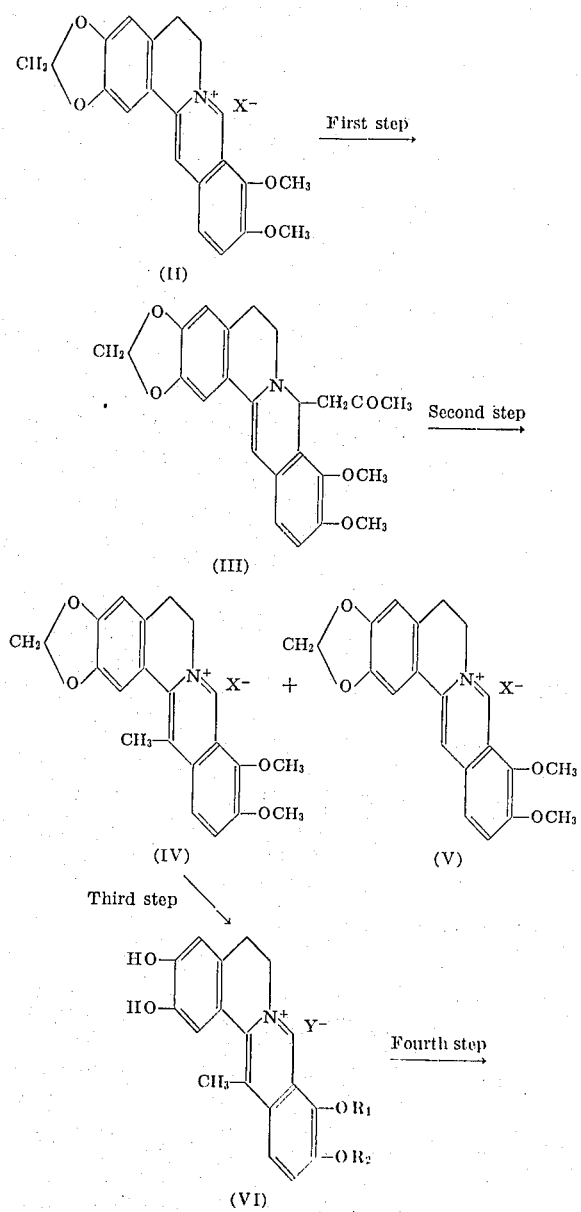

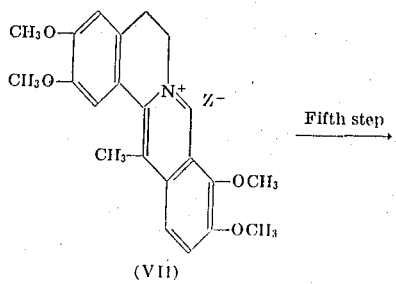

(VII)

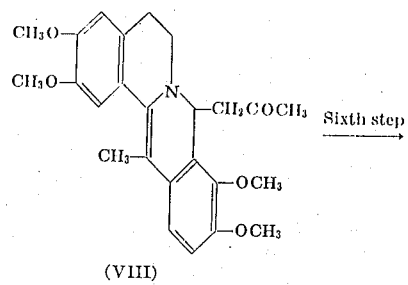

(VIII)

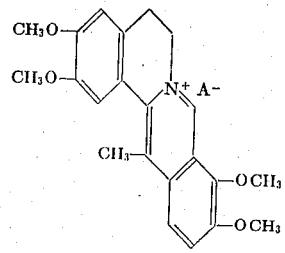

(I)

In the above scheme, X is a halogen atom, Y is a halogen atom or sulphate anion, Z is a halogen atom, sulphate anion or methylsulphate anion, $R_1$ and $R_2$ are each hydrogen atom or methyl group and A is the same as defined above.

In the first step, berberine halide (II) is reacted with acetone in the presence of alkali such as sodium hydroxide, potassium hydroxide, sodium methoxide, sodium ethoxide, potassium methoxide or potassium ethoxide to give 8-acetonylberberine (III).

The resulting 8-acetonylberberine (III) is reacted with a methyl halide, e.g., methyl chloride, methyl bromide or methyl iodide to give 13-methylberberine halide (IV) in the second step. The reaction may be carried out by heating at approximately 80° – 120°C. for several minutes to several hours, preferably 30 minutes to 3 hours in an autoclave or in a sealed tube. Although the obtained 13-methylberberine halide (IV) is in a state of admixture with berberine halide (V), it can be readily purified by utilizing their difference of solubility into organic solvents, that is, 13-methylberberine halide (IV) can be separated from the mixture by extracting with an organic solvent such as dichloromethane or chloroform.

In the third step, the separated 13-methylberberine halide (IV) is subjected to cleaving of methylenedioxy group to give novel compounds (VI). For cleaving of methylenedioxy group, the 13-methylberberine halide (IV) is reacted with anhydrous aluminum chloride, preferably in an aromatic hydrocarbon such as benzene, toluene or xylene and followed by hydrolysis with water or a mineral acid such as hydrochloric acid, hydrobromic acid or hydroiodic acid at a room temperature or preferably at an elevated temperature. Alternatively, the 13-methylberberine halide (IV) is reacted in direct with a mineral acid such as hydrochloric acid, hydrobromic acid or hydroiodic acid or phloroglucinsulphuric acid to cleave methylenedioxy group. Thus obtained novel compounds (VI) are a mixture of 13-methyl-2,3,9,10-tetrahydroxy-7,8,13,13a-tetradehydroberbinium salts (in the formula (VI), $R_1$ and $R_2$ are both hydrogen atom), 13-methyl-10-methoxy-2,3,9-trihydroxy-7,8,13,13-tetradehydroberbinium salts (in the formula (VI), $R_1$ is hydrogen atom and $R_2$ is methyl group) and 13-methyl-2,3-dihydroxy-9,10-dimethoxy-7,8,13,13a-tetradehydroberbinium salts (in the formula (VI), $R_1$ and $R_2$ are both methyl group). The ratio of the mixture is varied by reaction reagents and the reaction condition. However, these mixture can be used for the next step as it is, i.e., without purification.

In the fourth step, the obtained compounds (VI) are methylated by reacting with a conventional methylating agent such as dimethyl sulphate or methyl iodide to give dehydrocorydaline salts (VII) which are a mixture of various kinds of salts such as chloride, bromide, iodide, sulphate or methylsulphate.

The obtained dehydrocorydaline salts (VII) are led to the desired single salt of dehydrocorydaline by the following fifth and sixth steps.

In the fifth step, the dehydrocorydaline salts (VII) are led to 8-acetonyldehydrocorydaline (VIII) in the same manner as in the first step, i.e., by reacting with acetone in the presence of alkali. The dehydrocorydaline salts (VII) obtained by the fourth step may further include a small amount of impurity such as partially methylated compounds, e.g., 13-methyl-9-hydroxy-2,3,10-trimethoxy-7,8,13,13a-tetradehydroberbinium salt. However, the impurity can be readily separated out in this fifth step, that is, the partially methylated compounds may be changed to their alkali metal salts soluble in water in the fifth step and then readily separted out from the insoluble 8-acetonyldehydrocorydaline (VIII).

In the sixth step, 8-acetonyldehydrocorydaline (VIII) obtained above is reacted with an acid in a solvent such as water, methanol, ethanol or mixture thereof to give a desired dehydrocorydaline salt (I). The acid used in the reaction may be an inorganic acid such as hydrochloric, hydrobromic, hydroiodic, nitric, sulphuric acid or the like or an organic acid such as tannic, glycyrrhizic, gallic, benzilic, anisic, D-glucuronic, citric acid or the like.

The desired salt of dehydrocorydaline may be alternatively prepared as follows:

A salt of dehydrocorydaline is converted into its free base by reacting with an alkali metal hydroxide or alkoxide such as sodium hydroxide, potassium hydroxide, sodium methoxide or potassium ethoxide and then the free base is reacted with an acid above-mentioned. Alternatively, a salt of dehydrocorydaline is passed through a column of an anion exchange resin conditioned for desired acid.

The active substance from Corydalis tubers and dehydrocorydaline of the invention may be administered orally in a variety of forms, such as tablets, powders or capsules. Various vehicles, binders and lubricants which are compatible with the active substance are employed such as starch, lactose, microcrystalline cellulose, sugar, magnesium stearate or the like, as is well-known in the art.

For treatment of peptic ulcers by the active substance from Corydalis tubers and dehydrocorydaline in humans the required dosage per day is within the range of 0.1 to 10 mg. per kg. of body weight and 0.1 to 7 mg. per kg. of body weight, respectively. A preferred dosage per day is within the range of 0.5 to 5 mg. per kg. of body weight and 0.3 to 3 mg. per kg. of body weight, respectively, more particularly the range of 1 to 2 mg. per kg. of body weight and 0.8 to 1.5 mg. per kg. of body weight, respectively. The total dosage may be orally administered in smaller portions three or four times daily, as determined by the attending physician.

The preparation of the active substance from Corydalis tubers and dehydrocorydaline and the manufacture of a pharmaceutical composition containing the active substance or dehydrocorydaline are set out in the following Examples which are illustrative but not limiting.

EXAMPLE 1

5.0 kg. of powdered tuber of *Corydalis bubosa D.C.* were extracted four times, each for 4 hours with 16 liters of methanol. The combined extracts were evaporated under reduced pressure and thus concentrated extract was added to 2 liters of 10 percent by volume aqueous acetic acid. This mixture was treated with 300 g. of petroleum ether (b.p. 30°–40°C.) to remove the fat. The aqueous acidic layer was then made alkaline with gaseous ammonia to pH 9 and filtered. The filtrate was extracted several times with 3.5 liters of chloroform. The combined chloroform extracts were dried over anhydrous sodium sulphate, and concentrated by evaporation under reduced pressure. The residue was dissolved in 100 ml. of methanol and then neutralized with methanolic hydrogen chloride. Methanol was evaporated under reduced pressure and there was obtained 24.5 g. of the fraction A as yellowish brown powder suitable for subsequent clinical use.

EXAMPLE 2

5.0 kg. of powdered tuber of Corydalis bulbosa D.C. were extracted four times, each for 4 hours with 16 liters of methanol-water (5:1, v/v). The combined extracts were evaporated under reduced pressure to yield a concentrated aqueous methanol extract of the tuber of *Corydalis bulbosa D.C.* This extract was added to 2 liters of 10 percent by volume aqueous acetic acid and fat was removed by extraction with 300 g. of petroleum ether (b.p. 30°–40°C.). The aqueous acidic layer was made alkaline to pH 9 with gaseous ammonia, and extracted several times with 3 liters of chloroform. The combined chloroform extracts were dried over anhydrous sodium sulphate, and concentrated under reduced pressure. The residue was added to 300 ml. of ethanol and then neutralized with ethanolic hydrogen chloride. The mixture was evaporated to dryness under reduced pressure to yield 50 g. of the fraction B as a yellowish brown powder suitable for subsequent clinical use.

The fraction B had the following extinction coefficients in the ultra-violet and visible spectra: λmax. ($E_{1cm.}^{1\%}$) 228mµ (530–545), 280mµ (280–295), 340mµ (160–175), 430mµ (35–45).

EXAMPLE 3

5.0 kg. of powdered tuber of *Corydalis bulbosa D.C.* were extracted four times, each for 4 hours with 16 liters of methanol. The combined extracts were evaporated under reduced pressure and thus concentrated extract was added to 2 liters of 10 percent by volume aqueous acetic acid. The mixture was treated with 300 g. of petroleum ether (b.p. 30°–40°C.) to remove fat. The aqueous acidic layer was then made alkaline with 10 percent by weight sodium hydroxide aqueous solution to pH 9 and filtered. The filtrate was extracted several times with 3.5 liters of chloroform. The combined chloroform extracts were dried over anhydrous sodium sulphate and concentrated by evaporation under reduced pressure. The residue was dissolved in 100 ml. of methanol and then neutralized with methanolic hydrogen chloride. Methanol was evaporated under reduced pressure and there was obtained 24.5 g. of the fraction A as yellowish brown powder suitable for subsequent clinical use.

EXAMPLE 4

5.0 kg. of powdered tuber of Corydalis bulbosa D.C. were extracted four times, each 4 hours with 16 liters of methanol-water (5:1, v/v). The combined extracts were evaporated under reduced pressure to yield a concentrated aqueous methanol extract. The extract was added to 2 liters of 10 percent by volume aqueous acetic acid and extracted with 300 g. of petroleum ether (b.p. 30°–40°C.) to remove fat. The aqueous acidic layer was made alkaline with 10 percent by weight sodium carbonate aqueous solution to pH 9, and then extracted several times with 3 liters of chloroform. The combined chloroform extracts were dried over anhydrous sodium sulphate and concentrated under reduced pressure. The residue was added to 300 ml. of ethanol and then neutralized with ethanolic hydrogen chloride. The mixture was evaporated to dryness under reduced pressure to yield 50 g. of the fraction B as a yellowish brown powder suitable for subsequent clinical use.

EXAMPLE 5

Tablets were made of the following formulation.

|  | (mg.) |
| --- | --- |
| Fraction B | 12.5 |
| Lactose | 90 |
| Corn starch | 90.5 |
| Corn starch (for paste) | 6.0 |
| Magnesium stearate | 1.0 |
| Total | 200.0 |

12.5 mg. of the fraction B obtained by Example 2 and the other materials were mixed and granulated with a starch paste. The mixture was passed through a No. 12 mesh screen. The wet granulate was dried overnight in a oven at 40°C. The dried granulate was passed through a No. 16 mesh screen, and was mixed with the magnesium stearate. The mixture was compressed into flat-faced tablets containing about 12.5 mg. of the active substance per tablet.

EXAMPLE 6

Tablets were made of the following formulation.

|  | (mg.) |
| --- | --- |
| Dehydrocorydaline chloride | 15.0 |
| Microcrystalline cellulose | 75.0 |
| Corn starch | 8.0 |
| Light silicic acid anhydride | 1.0 |
| Magnesium stearate | 1.0 |
| Total | 100.0 |

EXAMPLE 7

820 g. of the powder of the tuber of Corydalis ambigua Cham. et Schlecht. var. amurensis Maxim. were extracted four times, each for 4 hours with 6 liters of ethanol-water (5:1, v/v). The combined extracts were treated in the same way as described in Example 2 to give 4.4 g. of the fraction B which showed similar physical constants to those of fraction B in Example 2.

EXAMPLE 8 a. To 3 kg. of berberine chloride were added 3 liters of water and further 15 liters of acetone and 10 liters of 50 percent by weight sodium hydroxide aqueous solution. The mixture was violently shaken for 5 minutes in a separating funnel. The acetone layer was separated. After concentrating the acetone solution, the resulting precipitate was recrystallized from acetone to give 2.42 kg. of 8-acetonylberberine.

b. 1.1 kg. of thus obtained 8-acetonylberberine was heated with 3 liters of methyl iodide for 3 hours at 100°C. in an autoclave. The reaction mixture was evaporated to remove the excess methyl iodide. To the resulting residue was added 100 liters of dichloromethane. The dischloromethane solution was collected and evaporated to remove the solvent. The resulting residue was recrystallized from methanol to give 600 g. of 13-methylberberine iodide.

c. A mixture of 100 g. of 13-methylberberine iodide, 500 g. of anhydrous aluminum chloride was heated on oil bath at 150° – 160°C. with agitation for 1 hour. The reaction mixture was added to a diluted hydrochloric acid cooled with ice. The reaction mixture was heated on water bath for 1 hour and then ice-cooled. The resulting precipitate was separated by filtration and recrystallized from methanol to give 70 g. of 13-methyl-2,3,9,10-tetrahydroxy-7,8,13,13a-tetradehydroberbinium chloride as a brownish yellow crystal having a decomposition point of 250°C.

Elementary analysis for $C_{13}H_{16}O_4NCl$:
Calculated: C 62.34%, H 4.65%, N 4.04%, Cl 10.22%
Found: C 62.38%, H 4.78%, N 3.93%, Cl 10.25% d. To 300 ml. of water was suspended 75 g. of 13-methyl-2,3,9,10-tetrahydroxy-7,8,13,13a-tetradehydroberbinium chloride. To the suspension were added with agitation 1 liter of 10 percent by weight sodium hydroxide aqueous solution and 150 ml. of dimethyl sulphate. After reacting at room temperature for 5 hours, the mixture was treated with concentrated ammonia to decompose the excess dimethyl sulphate and then made acidic by adding hydrochloric acid. The mixture was ice-cooled and the resulting precipitate was separated by filtration to give 80 g. of dehydrocorydaline mixed salts.

e. To 1.5 liter of water was dissolved 80 g. of above obtained dehydrocorydaline mixed salts. To the solution was added 50 ml. of acetone and 45 g. of sodium hydroxide and the mixture was agitated to give a precipitate of 8-acetonyldehydrocorydaline. The precipitate was separated by filtration, dissolved into hot diluted hydrochloric acid and filtered. The filtrate was cooled. The resulting precipitate was separated by filtration and recrystallized from ethanol to give 55 g. of dehydrocorydaline chloride as yellow needles having a melting point of 176° – 180°C. (decomp.)

Elementary analysis for $C_{22}H_{24}O_4NCl \cdot 3H_2O$:
Calculated: C 57.95%, H 6.63%, N 3.07%, Cl 7.78%, $H_2O$ 11.86%

Found: C 58.03%, H 6.81%, N 3.14%, Cl 7.76%, H$_2$O 11.72%

In the above (e) step, various kinds of acids were used instead of hydrochloric acid to give the following various salts:

| | |
|---|---|
| Dehydrocorydaline bromide | m.p. 210–212°C. (dec.) |
| Dehydrocorydaline iodide | m.p. 236–238°C. (dec.) |
| Dehydrocorydaline nitrate | m.p. 245–247°C. (dec.) |
| Dehydrocorydaline tannate | m.p. 207–212°C. (dec.) |
| Dehydrocorydaline glycyrrhizate | m.p. 221–224°C. (dec.) |
| Dehydrocorydaline gallate | m.p. 248–249°C. (dec.) |
| Dehydrocorydaline benzilate | m.p. 184–188°C. (dec.) |
| Dehydrocorydaline anisate | m.p. 160–163°C. (dec.) |
| Dehydrocorydaline D-glucuronate | m.p. 168–170°C. (dec.) |
| Dehydrocorydaline citrate | m.p. 206–208°C. (dec.) |

Extracts and dehydrocorydaline prepared in accordance with the foregoing procedure were administered to laboratory test animals following established procedures and were found to exhibit unexpected and desirable pharmacological properties. The following Examples are representative of such determinations. Dehydrocorydaline used in the following Examples was in a form of its hydrochloric acid salt.

EXAMPLE 9

The antispasmolytic activity of fraction B and dehydrocorydaline was compared with several conventional antispasmolytic agents, by the conventional isolated guinea pig ileum test. The results ($ED_{50}$ in g./ml.) are shown in Table 1.

Table 1

| Drugs | Anti- *1 acetylcholine | Anti-*2 BaCl$_2$ | Anti- *3 histamine |
|---|---|---|---|
| Fraction B | 2.1×10$^{-5}$ | 1.9×10$^{-4}$ | 4.6×10$^{-4}$ |
| Dehydrocorydaline | 1.5×10$^{-5}$ | 5×10$^{-5}$ | 5×10$^{-5}$ |
| Atropine sulphate | 1.5×10$^{-9}$ | 2.0×10$^{-8}$ | 5.9×10$^{-5}$ |
| Propantheline bromide | 5.5×10$^{-9}$ | | |
| Papaverine | 3.2×10$^{-5}$ | 2.4×10$^{-6}$ | 4.6×10$^{-6}$ |

*1: Dose of acetylcholine chloride: 1×10$^{-8}$ g./ml.
*2: Dose of BaCl$_2$: 1×10$^{-4}$ g./ml.
*3: Dose of histamine: 5×10$^{-4}$ g./ml.

The active substance (Fraction B) and dehydrocorydaline have weak spasmolytic action on isolated ileums of guinea pig as shown above. But their action is not atropine-like action but papaverine-like action. Propantheline bromide, which has been widely used as a cholinolytic agent, shows strong anti-acetylcholine action (against low concentration of acetylcholine chloride) as well as atropine sulphate.

EXAMPLE 10

The influence on the parasympathomimetic agents of Fraction B and dehydrocorydaline was demonstrated in three animal tests as follows:

a. Inhibitory action on the pilocarpine-induced salivation

Method: Male dd-mice weighing 18 – 20 g. were given intraperitoneally with pilocarpine hydrochloride (0.2 mg./mice) and the induced salivation was observed for several hours after the injection. The results are set forth in the following Table 2.

Table 2

| Drugs | Dose in mg./kg. s.c. | Salivation |
|---|---|---|
| Control | — | 10/10 |
| Atropine sulphate | 0.05 | 5/5 |
| | 0.1 | 4/5 |
| | 0.2 | 3/5 |
| | 0.4 | 0/5 |
| Dehydrocorydaline | 0.5 | 5/5 |
| | 1 | 5/5 |
| | 2 | 5/5 |
| | 4 | 5/5 |
| | 8 | 5/5 |
| Fraction B | 2.5 | 5/5 |
| | 7.5 | 5/5 |
| | 15.0 | 5/5 |

Result: Fraction B and dehydrocorydaline do not inhibit pilocarpine-induced salivation in mice, while atropine significantly inhibits the said response.

b. Inhibitory action on Tremorine-induced salivation and tremor

Method: Tremorine (20 mg./kg.) was injected intraperitoneally to male dd-mice weighing 18 – 20 g. and the drugs to be tested were administered to animals at 30, 60, 90 and 120 minutes, respectively, before the injection of tremorine. The salivation and tremor induced by tremorine were noted as shown in Table 3.

Table 3

| Drugs | Dose mg./kg. s.c. | Salivation 30 60 90 120min. | Tremor 30 60 90 120min. |
|---|---|---|---|
| Control | — | 5/5*¹5/5 5/5 5/5 | 5/5*²5/5 5/5 5/5 |
| Atropine sulphate | 30 | 0/5 0/5 0/5 0/5 | 0/5 0/5 0/5 0/5 |
| | 10 | 0/5 0/5 0/5 0/5 | 0/5 0/5 0/5 0/5 |
| | 5 | 0/5 0/5 0/5 0/5 | 0/5 0/5 0/5 0/5 |
| Dehydrocorydaline | 20 | 5/5 5/5 5/5 5/5 | 5/5 5/5 5/5 5/5 |
| | 10 | 5/5 5/5 5/5 5/5 | 5/5 5/5 5/5 5/5 |
| | 5 | 5/5 5/5 5/5 5/5 | 5/5 5/5 5/5 5/5 |
| Fraction B | 15 | 5/5 5/5 5/5 5/5 | 5/5 5/5 5/5 5/5 |
| | 7.5 | 5/5 5/5 5/5 5/5 | 5/5 5/5 5/5 5/5 |
| | 2.5 | 5/5 5/5 5/5 5/5 | 5/5 5/5 5/5 5/5 |

*¹: Number of mice with salivation/total number of tested mice
*²: Number of mice with tremor/total number of tested mice Result: Fraction B and dehydrocorydaline do not inhibit tremoline-induced salivation and tremor in mice, while atropine significantly inhibits the responses.

c. Influence on the pupil-diameter in male dd-mice

Method: The drugs to be tested were given subcutaneously to male dd-mice weighing 18 – 20 g. Mice pupil diameter was measured microscopically under constant light in the dark room for photography immediately before and at 15, 30, 60, 120 and 180 minutes after the administration of drugs. (Pulewka: *Arch. f. Exper. Path. u. Pharmakol.*, Vol. 168, page 307, 1932) The results are shown in the following Table 4.

Table 4

| Drugs | Dose mg./kg. s.c. | (pupil diameter in mm.) Mydriatic activity | | | | | |
|---|---|---|---|---|---|---|---|
| | | 0 | 15 | 30 | 60 | 120 | 180 min. |
| Control | 0 | 0.44 | 0.50 | 0.52 | 0.48 | 0.43 | 0.44 |
| Atropine sulphate | 0.002 | 0.43 | 0.30 | 0.97 | 0.60 | 0.45 | 0.38 |
| | 0.004 | 0.53 | 1.70 | 2.13 | 1.98 | 1.10 | 0.82 |
| | 0.006 | 0.60 | 1.70 | 2.20 | 1.98 | 1.60 | 1.14 |
| Dehydro-Corydaline | 0.02 | 0.46 | 0.46 | 0.50 | 0.46 | 0.40 | — |
| | 0.04 | 0.49 | 0.46 | 0.48 | 0.44 | 0.43 | — |

Table 4 —Continued

| Drugs | Dose mg./kg. s.c. | (pupil diameter in mm.) Mydriatic activity | | | | | |
|---|---|---|---|---|---|---|---|
| | | 0 | 15 | 30 | 60 | 120 | 180 min. |
| Fraction B | 0.08 | 0.40 | 0.36 | 0.28 | 0.25 | 0.28 | 0.29 |
| | 0.16 | 0.38 | 0.32 | 0.28 | 0.28 | 0.31 | 0.32 |
| | 2.5 | 0.36 | 0.36 | 0.33 | 0.34 | 0.32 | 0.35 |
| | 7.5 | 0.39 | 0.32 | 0.31 | 0.32 | 0.29 | 0.31 |
| | 15.0 | 0.33 | 0.29 | 0.33 | 0.31 | 0.29 | 0.31 |

Result: Fraction B and dehydrocorydaline do not show the pupil dilatation.

From these results it will be apparent that the active substance from Corydalis tubers and dehydrocorydaline exhibit little anti-acetylcholine action. i.e., atropine-like action, and that their anti-secretory activity is not atributable to anti-cholinergic mechanisms.

EXAMPLE 11

Influence on the pepsin activity in gastric juice and gastric juice volume in the pylorus ligated rats Method: Male Wistar rats weighing 200 – 220 g. were used. The pylorus ligation was performed during ether anesthesia and then the animals were sacrificed by over dose of ether. For 6 hours after the sacrifice, gastric juice volume was measured. The pepsin activity was determined by the method of Anson et al. (*J. Gen. Physiol.*, Vol. 22, page 79, 1933) The results are set out in the following Table 5.

Table 5

| Drug | Dose mg./kg. s.c. | No. of rats | Pepsin content (mEq./6 hrs.) | Gastric juice (ml./100 g. of body weight) |
|---|---|---|---|---|
| Control | — | 6 | 16.59±1.81 | 3.77±0.88 |
| Dehydro corydaline | 1.5 | 5 | 8.22±0.38 | 2.42±0.37 |
| | 3.0 | 5 | 3.89±0.60 | 1.68±0.12 |
| | 6.0 | 5 | 3.76±0.49 | 0.94±0.24 |
| | 12.0 | 5 | 2.16±0.17 | 0.57±0.11 |

Result: Dehydrocorydaline exhibits pepsin content and gastric secretion.

EXAMPLE 12

Antigastric ulcer activity in pylorus ligated rats

Method: H. Shay el al: *Gastroenterol.* Vol. 5, page 43, 1945 Male Wistar rats: fasting for 48 hours and pylorus ligation for 18 hours. The data so obtained are shown in Table 6.

Result: In pylorus ligated rats, Fraction B and dehydrocorydaline significantly reduced the gastric juice volume and ulcer severity.

Table 6

| Drugs | Number of | Dose mg./kg. | Gastric volume ml./100 g. of | Ulcer 2/10 | Ulcer index=[1] s.c. | Gastric body weight |
|---|---|---|---|---|---|---|
| Control | 75 | — | 7.16 | 69/75=[2] | 3.02 | 8/75=[3] |
| Fraction B | 10 | 50 | 5.23 | 6/10 | 1.80 | 0/10 |
| | 10 | 100 | 3.21 | 2/10 | 1.00 | 0/10 |
| Dehydrocorydaline | 4 | 6.25 | 6.18 | 4/4 | 2.00 | 0/4 |
| | 4 | 12.5 | 3.39 | 1/4 | 0.75 | 0/4 |
| | 4 | 25 | 0.79 | 0/4 | 0 | 0/4 |
| | 4 | 50 | 0.43 | 0/4 | 0 | 0/4 |
| Atropine sulphate | 8 | 5 | 5.89 | 8/8 | | |
| | 6 | 15 | 3.86 | 5/6 | | |
| 6 | 25 | 1.69 | 0/6 | | | |
| Papaverine HCl | 5 | 50 | 8.01 | 5/5 | | |

=[1]: Ulcer index: cf. E. Adami et al; Arch. intern. Pharmacodyn. Vol. 147, page 113, 1964
  0: no lesion
  1: hemorrhage
  2: 1 – 5 small ulcer (3 mm.)
  3: many small ulcers (more than 5) or single large size ulcer (more than 3 mm.)
  4: many large ulcers
  5: perforated ulcer
=[2]: Number of rats with ulcer rumen/number of tested rats
=[3]: Number of rats with gastric perforation/number of tested rats

EXAMPLE 13

Influence on free and total acidities, pH, ulcer occurrence and gastric juice volume in the pylorus ligated rat Method: The Shay rats were sacrificed at 18 hours after the pylorus ligation. Free and total acidities were measured by the titration (N/100 sodium hydroxide) using the indicator of Toepfer and phenolphthalein, respectively. The ulcer index calculated as described in Example 12, appears in the Table 7.

Result: Dehydrocorydaline significantly reduced the free acidity, total acidity, pH, ulcer index and gastric juice volume.

Table 7

| Drug | Number of rats | Dose mg./kg. s.c. | Free acidity | Total acidity | pH | Ulcer index | Ulcer per total | Gastric juice ml./100 g. of body weight |
|---|---|---|---|---|---|---|---|---|
| | | | μEq./rat | | | | | |
| Control | 4 | — | 279.2 | 483.1 | 1.70 | 2.67 | 4/4 | 8.6 |
| Dehydrocorydaline | 4 | 7.5 | 211.0 | 372.1 | 1.70 | 2.00 | 4/4 | 6.2 |

Table 7 —Continued

| Drug | Number of rats | Dose mg./kg. s.c. | Free acidity | Total acidity μEq./rat | pH | Ulcer index | Ulcer per total | Gastric juice ml./100 g. of body weight |
|---|---|---|---|---|---|---|---|---|
| | 4 | 12.5 | 188.2 | 316.5 | 1.60 | 0.75 | 1/4 | 3.4 |
| | 4 | 25.0 | 39.9 | 90.2 | 1.55 | 0.00 | 0/4 | 0.8 |

EXAMPLE 14

Effects on histamine activity in the dog with Heidenhain pouch

Method: Male mongrel dog with Heidenhain pouch weighing 9.5 kg. was given the drugs to be tested at one hour before the subcutaneous injection of histamine HCl (0.1 mg./kg.) and pyribenzamine HCl (1.25 mg./kg.). Gastric juice collected for next 50 minutes was as shown in Table 8.

Result: Fraction B and dehydrocorydaline inhibited the histamine-induced gastric secretion in the dog with Heidenhain pouch. histamine-induced gastric Table 8

| Drugs | Dose mg./kg. s.c. | Gastric secretion ml. | Free acidity total | /ml. mEq. | Total acidity total | /ml. mEq. | Gastric pH |
|---|---|---|---|---|---|---|---|
| Control | — | 10.2 | 0.97 | 0.0097 | 1.30 | 0.130 | 1.25 |
| Fraction B | 50 | 0.4 | 0.003 | 0.0075 | 0.027 | 0.0675 | 3.15 |
| Dehydrocorydaline | 6 | 8.4 | 0.815 | 0.097 | 1.234 | 0.147 | 1.00 |
| | 10 | 2.5 | 0.087 | 0.035 | 0.287 | 0.115 | 2.10 |

EXAMPLE 15

Effects on histamine activity in the dog with a simple gastric fistula (Witzel's gastrostomy)

Method: Histamine sulphate (0.1 mg./kg.) and pyribenzamine HCl (1.25 mg./kg.) were injected subcutaneously 1 hour after the drugs to be tested were subcutaneously administered to the dog. For next 1.5 hours, gastric juice was collected for analysis of the volume, free acidity and total acidity. The results of this demonstration were so shown in Table 9.

Table 9

| Drugs | Dose mg./kg. s.c. | Gastric secretion ml. | Free acidity mEq. | total acidity mEq. |
|---|---|---|---|---|
| Control | — | 54.1 | 5.356 | 6.831 |
| Fraction B | 50 | 15.7 | 0.880 | 1.340 |
| Dehydrocorydaline | 20 | 23.0 | 1.820 | 2.310 |

Result: Fraction B and dehydrocorydaline inhibited the histamine-induced gastric secretion, free acidity and total acidity in the dog with a simple gastric fistula.

EXAMPLE 16

Anti-stress ulcer activity

Method: Male and female Wistar rats weighing 100 g. were subjected to stress by fasting for 24 hours and then restraint for next 18 hours using the method of Brodie et al. (D.A. Brodie and H.M. Eanson, *Gastroenterology* Vol. 38, page 353, 1960) After restraint, stomach was removed and the degree of ulceration was graded according to the same manner as in Shay rats (Example 12). The results are shown in Table 10.

Table 10

| Drugs | Number of rats | Dose mg./kg. | Ulcer incidence | Ulcer index[1] Glandular |
|---|---|---|---|---|
| Control | 12 | saline | 66.7 | 2.89 |
| Fraction B | 7 | 100 | 50.0 | 2.31 |
| Dehydrocorydaline | 5 | 12.5 | 60.0 | 2.22 |
| | 5 | 25 | 40.0 | |

[1]: The same ulcer index as in Example 12

EXAMPLE 17

Anti-cortisone ulcer activity

Method: To male Wistar rats weighing 150 g., fasting for 18 hours, were administered subcutaneously cortisone acetate (10 mg./rat) and drug daily for next four days with fasting. (A. Robert and J. A. Nezamis, *Proc. Soc. exptl. Biol. Med.* Vol. 99, page 443, 1958) The results are shown in Table 11.

Table 11

| Drug | Number of rats | Dose mg./kg. s.c. | Ulcer incidence | Ulcer index[1] glandular |
|---|---|---|---|---|
| Control | 10 | saline | 100 | 3.78 |
| Fraction B | 5 | 100 | 80 | 2.50 |

[1]: The same index as used in Example 12

EXAMPLE 18

Anti-fasting ulcer activity

Method: To male Wister rats weighing 250 g. were administered drug to be tested daily with fasting for 7 days, and further 10 percent glucose (50 ml./kg., p.o.) daily. (E. Adami et al., *Arch. intern. pharmacodyn.* Vol. 147, page 113, 1964) The results are shown in Table 12.

Table 12

| Drug | No. of rats | dose mg./kg. | Gastric ulcer Glandular % | index[1] | Rumen % | index[1]hu 1 |
|---|---|---|---|---|---|---|
| Control | 9 | saline | 67 | 1.44 | 100 | 3.67 |
| Fraction B | 7 | 100 | 86 | 2.00 | 85 | 2.29 |

[1]: The same index as in Example 12

Example 19

Effect of vagotomy on the inhibitory action of dehydrocorydaline to the gastric secretory function in rats Bilateral vagotomy at the caudal site of diaphragma was performed to rats for studying the influence of vagotomy on the inhibitory action of dehydrocorydaline to the gastric secretory function. After vagotomy, the secretory volume of gastric juice was measured. The pylorus of rats was ligated at 24 hours before the measurement of the volume of gastric juice. The results are shown in Table 13.

As shown in Table 13, the volume of gastric juice in rats was significantly reduced by vagotomy. On the other hand, the anti-secretory action of dehydrocorydaline was not affected by vagotomy.

Table 13

| Drug | Dose mg./kg. s.c. | Number of rats | Gastric juice volume ml./100 g. of body weight |
|---|---|---|---|
| Intact normal rats | | | |
| Control | — | 8 | 7.65 ± 0.631 |
| Dehydrocorydaline | 25 | 5 | 0.79 ± 0.093 |
| Vagotomized rats | | | |
| Control | — | 7 | 1.90 ± 0.318 |
| Dehydrocorydaline | 25 | 7 | 0.59 ± 0.242 |

EXAMPLE 20

Effect of adrenalectomy on the inhibitory action of dehydrocorydaline to the gastric secretory function in rats The pylorus of bilateral adrenalectomized rats, maintained with saline for 6 days, was ligated and the secretory volume of gastric juice was measured for 6 hours. Dehydrocorydaline was administered subcutaneously immediately after the ligation and then the effect of dehydrocorydaline on the secretory volume of gastric juice in adrenalectomized rats was observed and compared with that in intact normal rats without adrenalectomy. The results are shown in Table 14.

As shown in Table 14, in adrenalectomized rats, the anti-secretory action of dehydrocorydaline was decreased, while in intact normal rats, the said action appeared as usual.

Table 14

| Drug | Number of rats | Dose mg./kg. s.c. | Gastric juice volume ml./100 g. of body weight |
|---|---|---|---|
| Adrenalectomized rats | | | |
| Control | 10 | — | 2.83 ± 0.307 |
| Dehydrocorydaline | 8 | 6 | 2.28 ± 0.439 |
| Intact normal rats | | | |
| Control | 6 | — | 3.77 ± 0.881 |
| Dehydrocorydaline | 5 | 6 | 0.94 ± 0.238 |

EXAMPLE 21

Effects of reserpine and dopa(3,4-dihydroxyphenylalanine) on the inhibitory action of dehydrocorydaline to the secretory function in rats Reserpine, dopa and/or dehydrocordaline, alone or in a combination as shown in the following Table 15, were administered subcutaneously to some groups of rats in a dose of 4 mg. per kg., 200 mg. per kg. and 6 mg. per kg. of body weight, respectively. Dehydrocorydaline was administered at the same time as pylorus was ligated. Reserpine and DL-dopa were administered at 24 hours and 30 minutes before the pylorus ligation and the effects of reserpine and/or dopa on the antisecretory action of dehydrocorydaline was observed. The results are shown in Table 15.

As shown in Table 15, the anti-secretory action of dehydrocorydaline was significantly suppressed by pre-administration of reserpine but not by dopa. When dope was administered after administration of reserpine, the effect of reserpine on the anti-secretory action of dehydrocorydaline was slightly inhibited.

Table 15

| Drugs | Number of rats | Gastric juice volume ml./100 g. of body weight |
|---|---|---|
| Untreated control | 7 | 3.65 ± 0.658 |
| Reserpine | 9 | 3.35 ± 0.253 |
| Dopa | 6 | 2.66 ± 0.362 |
| Dehydrocorydaline | 9 | 0.85 ± 0.187 |
| Dopa + Dehydrocorydaline | 6 | 0.93 ± 0.083 |
| Reserpine + Dehydrocorydaline | 15 | 2.37 ± 0.238* |
| Reserpine + dopa | 6 | 4.37 ± 0.299 |
| Reserpine + dopa + dehydrocorydaline | 6 | 1.67 ± 0.257* |

* P<0.05

EXAMPLE 22

Effects on blood pressure and pressure responses induced by acetylchlorine, epinephrine and nicotine in cats.

To cats anesthetized by administering intraperitoneally 35 mg. per kg. of body weight of sodium pentobarbital was administered intravenously dehydrocorydaline, and then the effects of dehydrocorydaline on blood pressure was observed. To other groups of anesthetized cats were injected intravenously acetylcholine (1 μg./kg.), epinephrine (3 μg./kg.) or nicotine (5 μg./kg.) and further dehydrocorydaline, and then the influences of dehydrocorydaline on the change of blood pressure induced by acetylchlorine, epinephrine or nicotine were also observed. The results are shown in Table 16.

As shown in Table 16, the administration of dehydrocorydaline in doses of 0.3, 1.0 and 3.0 mg. per kg. of body weight caused the lowering of blood pressure which came back to the normal level within about 1 – 5 minutes. Dehydrocorydaline did not alter the depressor response induced by acetylchloine or the pressor response induced by nicotine. The pressor response induced by epinephrine was potentiated by 1 mg. per kg. of body weight of dehydrocorydaline, but on the contrary, inhibited by 3mg. per kg. of body weight of dehydrocorydaline.

Table 16

| Drugs | Dose mg./kg. | Maximal response mmHg | Duration *[1] minute |
|---|---|---|---|
| Dehydrocorydaline | 0.1 | − 4.0 | 0.5 |
| | 0.3 | −17.4 | 1.6 |
| | 1.0 | −31.2 | 2.2 |
| | 3.0 | −84.0 | 4.3 |
| Acetylcholine | | −42.0 | |
| Acetylchloline + dehydrocorydaline | 1.0 | −42.5 | |
| | 3.0 | −41.8 | |
| Epinephrine | | +50.9 | |
| Epinephrine + dehydrocorydaline | 1.0 | +60.1 | >100 |
| | 3.0 | +38.8 | 60 |
| Nicotine | | +18.8 | |

Table 16—Continued

| Drugs | Dose mg./kg. | Maximal response mmHg | Duration *¹ minute |
|---|---|---|---|
| Nicotine + dehydrocorydaline | 1.0 | +19.0 | |
| | 3.0 | +19.2 | |

*¹: Period from the administration of dehydrocorydaline till coming back to pre-administration level From the results in Examples 9, 10, 19, 20, 21 and 22, it is suggested that sympathetic mechanism may be involved in the action of dehydrocorydaline on the gastric secretory function.

EXAMPLE 23

Effect on catecholamine uptake in rat atrial muscle

Adult Wistar rats were sacrificed and the heart was quickly removed and preserved in an oxigenated Krebs-Henseleit's solution. The atrium was then isolated and incubated with 1-norepinephrine ($5 \times 10^{-6}$ g./ml.) at 37°C. for 10 minutes. After the incubation, the atrium was rinsed briefly with a Krebs-Henseleit's solution, blotted on filter paper, weighed and then its amine contents were assayed. The drugs to be tested were added at 90 minutes before the incubation. The effect of dehydrocorydaline on amine contents, i.e., the effects on the uptake of norepinephrine in rat atrial muscle was compared with that of imipramine: 5-(3-dimethylaminopropyl)-10,11-dihydro-5H-dibenzo[b,f]azepine which has been used as antidepressant. The results are shown in Table 17.

As shown in Table 17, both of dehydrocorydaline and imipramine at medium concentration of $1 \times 10^{-6}$ and/or $5 \times 10^{-6}$ g./ml. greatly inhibited the uptake of norepinephrine. These results indicate that dehydrocorydaline may effectively block the membrane amine pump.

Table 17

| Drugs | No. of rats | Dose g./ml. | Norepinephrine μg./g. of tissue | % to A |
|---|---|---|---|---|
| Non-treatment | 4 | — | 1.20 ± 0.06 | |
| Norepinephrine | 4 | | 3.07 ± 0.06(A) | |
| Norepinephrine + dehydrocorydaline | 4 | $1 \times 10^{-6}$ | 2.53 ± 0.48 | −17.6 |
| Norepinephrine + imipramine | 4 | $1 \times 10^{-6}$ | 2.36 ± 0.16 | −23.1 |
| Non-treatment | 4 | — | 1.17 ± 0.12 | |
| Norepinephrine | 4 | | 204 ± 0.24(A) | |
| Norepinephrine + dehydrocorydaline | 4 | $5 \times 10^{-6}$ | 1.17 ± 0.10 | −43.1 |
| Norepinephrine + imipramine | 4 | $5 \times 10^{-6}$ | 1.26 ± 0.24 | −38.2 |

EXAMPLE 24

Effect on monoamine oxidase activity

The effect of dehydrocorydaline or monoamine oxidase activity was examined both in vivo and in vitro by using the manometric method (K. Nakamura, Y. Masuda, H. Tatsumi and K. Fujimoto: Jap J. Pharmacol., Vol. 13, page 186, 1963). In vivo experiments, Wistar male rats were used, and dehydrocorydaline was injected subcutaneously at various time before the sacrification. The effect of dehydrocorydaline on monoamine oxidase activity was compared with those of nialamide: isonicotinic acid 2-[2-(benzylcarbamoyl)ethyl]-hydrazide and iproniazid: isonicotinic acid 2-isopropylhydrazide. The results are shown in Tables 18 and 19.

As shown in Tables 18 and 19, dehydrocorydaline in a dose of 30 mg. per kg. of body weight in vivo or $10^{-4}$ g./ml. in vitro, did not inhibit the monoamine oxidase activity of brain, liver and stomach, while nialamide and iproniazid significantly inhibited the said activity.

Table 18

| Drugs | Number of rats | Dose mg./kg. s.c. | Time after administration hour | Monoamine oxidase activity μl. O₂/100 mg./60 min. | | |
|---|---|---|---|---|---|---|
| | | | | Brain | Liver | Stomach |
| Control | 5 | — | 0 | 28.50±1.53 | 60.82±5.07 | 13.98±1.58 |
| Dehydrocorydaline | 5 | 30 | 3 | 27.72±1.53 | 63.10±3.36 | 10.14±1.63 |
| | 5 | 30 | 6 | 27.06±0.97 | 54.48±5.72 | 12.98±1.82 |
| | 5 | 30 | 24 | 26.50±0.71 | 57.08±4.00 | 13.48±0.84 |
| Nialamide | 5 | 30 | 3 | 9.86±0.81* | 8.70±0.74* | 10.56±0.71 |
| | 5 | 30 | 6 | 12.78±2.20* | 7.40±1.94* | 5.20±0.89* |
| | 5 | 30 | 24 | 16.42±0.39* | 15.20±1.32* | 6.80±1.12** |

*P <0.01.
** P <0.05

Table 19

| Drugs | Concentration g./ml. | Monoamine oxidase activity (O₂ uptake) | |
|---|---|---|---|
| | | μl./60 min. | % in inhibition |
| Control | | 21.5 | |
| Dehydrocorydaline | $10^{-4}$ | 21.9 | −2.1 |
| | $10^{-5}$ | 21.4 | 0.5 |
| Iproniazid | $10^{-4}$ | 1.5 | 93.1 |
| | $10^{-5}$ | 13.8 | 35.7 |
| | $10^{-6}$ | 17.3 | 19.7 |

EXAMPLE 25

Effect on catechole-O-methyltransferase activity in vitro

Adult Wistar male rats were sacrificed and the liver was quickly removed. The liver was then homogenized together with isotonic potassium chloride solution. From this homogenate, the partially purified enzyme was finally obtained by the method according to J. Axelrod (J. Biol. Chemist., Vol. 233, page 702, 1958). To norepinephrine solutions in various concentrations were added the partially purified enzyme together with dehydrocorydaline in various concentrations. As the control, the partially purified enzyme was added alone to the norepinephrine solutions. Then, normethanephrine formed from norepinephrine was measured by the modified method of H. Ozawa (Yakugaku-Zasshi, Vol. 87, page 345, 1967). The results are shown in Table 20.

Table 20

| Concentration of norepinephrine (g./ml.) | Control | Normethanephrine formed (μg./20 min.) Concentration of dehydrocorydaline (g./ml.) | | |
|---|---|---|---|---|
| | | $10^{-3}$ | $10^{-4}$ | $10^{-5}$ |
| $10^{-3}$ | 26.5 | 24.0 | 27.0 | 27.3 |
| $5\times10^{-4}$ | 18.0 | 16.3 | 17.5 | 18.0 |
| $3.3\times10^{-4}$ | 13.7 | 12.3 | 13.0 | 13.6 |
| $2.5\times10^{-4}$ | 11.3 | 10.3 | 10.8 | 11.0 |
| $2.0\times10^{-4}$ | 9.5 | 8.3 | 8.7 | 8.7 |

The results obtained in Examples 22, 23, 24 and 25 demonstrated that dehydrocorydaline altered the pressor response of epinephrine and greatly inhibited the uptake of catecholamine, while dehydrocorydaline diol not inhibit both of the monoamine oxidase activity in vitro and in vivo and the catechole-O-methyltransferase activity in vitro. There has been reported by Bass and Patterson that catechloamine exerted a gastric anti-secretory effect in rats, and in general, drugs increasing the biological half life of catecholamine decreased gastric secretion (P. Bass and M. A. Patterson: *J. Pharmacol.*, Vol. 156, page 143, 1967). It is suggested that the antisecretory action of dehydrocorydaline is affected by altering the catecholamine activity.

EXAMPLE 26

Acute lethal toxicity
a. Animal: male and female mice, ddN-strain, weighing 18–22 g.
Observation: one dose — 10 mice, 1 week — observation Table 21

| | Administration route | Sex | $LD_{50}$ in mg./kg. |
|---|---|---|---|
| Fraction B | i.v. | M | 52.1 |
| | | F | 47.9 |
| | s.c. | M | 90.0 |
| | | F | 89.0 |
| | p.o. | M | 917 |
| | | F | 1000 |
| Dehydrocorydaline | i.v. | M | 16.0 |
| | | F | 9.5 |
| | s.c. | M | 17.0 |
| | | F | 16.2 |
| | p.o. | M | 410 |
| | | F | 430 | i.v.=intravenous
s.c.=subcutaneous
p.o.=by mouth b. Animal: male and female rats, Wistar-strain, weighing 150 – 170 g.
Observation: one dose — 5 rats, 1 week — observation Table 22

| | Administration route | Sex | $LD_{50}$ in mg./kg. |
|---|---|---|---|
| Fraction B | i.v. | M | 180 |
| | | F | 175 |
| | s.c. | M | 260 |
| | | F | 220 |
| | p.o. | M | 2000 |
| | | F | 2000 |
| Dehydrocorydaline | i.v. | M | 71.0 |
| | | F | 56.0 |
| | s.c. | M | 70.0 |
| | | F | 58.0 |
| | p.o. | M | >1000 |
| | | F | >1000 | i.v.=intravenous
s.c.=subcutaneous
p.o.=by mouth

Table 23

| Patient No. | Age | Sex | Diagnosis | Medication | | Main subjective symptom | Treatment evaluation | Side effect |
|---|---|---|---|---|---|---|---|---|
| 1 | 53 | M | Gastric ulcer | $100^{mg.}$ | $\times 33^{days}$ | Epigastric pain | Excellent | — |
| 2 | 46 | M | Duodenal ulcer | 100 | $\times 35$ | Epigastric fulness | Good | — |
| 3 | 21 | M | Duodenal ulcer | 100 | $\times 26$ | Epigastric pain | Good | — |
| 4 | 44 | M | Gastric ulcer | 100 | $\times 35$ | Epigastric pain | Excellent | — |
| 5 | 29 | M | Gastric ulcer | 100 | $\times 47$ | Epigastric pain | Excellent | Constipation |
| 6 | 45 | M | Gastric ulcer | 100 | $\times 7$ | Epigastric pain | Good | — |
| 7 | 58 | M | Gastric ulcer | 100 | $\times 60$ | Epigastric pain | Good | — |
| 8 | 33 | M | Duodenal ulcer | 100 | $\times 36$ | Epigastric pain | Excellent | Pyrosis, fever |
| 9 | 24 | M | Duodenal ulcer | 100 | $\times 34$ | Epigastric pain | Good | — |
| 10 | 50 | M | Duodenal ulcer | 100 | $\times 35$ | Epigastric pain | Excellent | Constipation |
| 11 | 32 | M | Gastric ulcer | 100 | $\times 10$ | Epigastric pain | Good | Pyrosis |
| 12 | 48 | M | Duodenal ulcer | 100 | $\times 15$ | Epigastric pain | Good | — |
| 13 | 24 | M | Duodenal ulcer | 100 | $\times 14$ | Epigastric pain | Good | — |
| 14 | 31 | F | Gastric ulcer | 100 | $\times 7$ | Nausea, epigastric fulness | Not improved | — |
| 15 | 45 | M | Anastomotic ulcer | 100 | $\times 12$ | Epigastric pain | Not improved | — |
| 16 | 56 | F | Gastric ulcer | 100 | $\times 57$ | Pyrosis, epigastric pain | Excellent | Fever |
| 17 | 17 | M | Gastric ulcer | 100 | $\times 30$ | Epigastric pain | Good | — |
| 18 | 53 | M | Duodenal ulcer | 100 | $\times 34$ | Pyrosis, epigastric pain | Good | — |
| 19 | 28 | M | Duodenal ulcer | 100 | $\times 40$ | Abdominal pain | Good | — |
| 20 | 39 | M | Gastric ulcer | 100 | $\times 35$ | Epigastric pain | Good | — |
| 21 | 22 | M | Duodenal ulcer | 100 | $\times 34$ | Nausea | Not improved | — |
| 22 | 28 | M | Gastric ulcer | 100 | $\times 120$ | Epigastric pain | Excellent | — |
| 23 | 37 | F | Duodenal ulcer | 100 | $\times 100$ | Epigastric pain | Excellent | — |

EXAMPLE 27

A clinical study was made covering 20 male patients and three female patients, a total of 23, ages ranging from 17 to 58 years. Of these, 11 patients has gastric ulcer, 11 duodenal ulcer and 1 had an anastomotic ulcer. In all of them, ulcer niche was observed by roentgenogram examination. The duration of symptoms before the treatment varied from 4 days to 6 years. The active substance, in tablets obtained in Example 5, was administered orally four times per day (two tablets per time) to each patient. Thus 100 mg. of the active substance was given to each patient per day of treatment. The period of treatment ranged from 7 to 120 days. The pertinent data from this study appear in Table 23.

The results based upon subjective symptoms are presented in Table 24. Of the 17 patients describing pain before the treatment, such symptoms diminished within a week after the start of treatment for 14 patients. In two patients pain recurred during treatment in spite of diminishing once at from 4 to 7th day after the start of treatment and thus the treatment is considered non-effective. In seven of eight patients describing epigastric fullness associated with sour or maldodorous eructations, the symptoms diminished within a week after the start of treatment. In the subjects bearing acidismus such as pyrosis, eructation and acid eructation, nausea or vomiting, the evaluation of the effect is somewhat uncertain due to the limited number of such patients.

The results in regard to ulcer niche are shown in Table 25. Of 11 patients with gastric ulcer, disappearance of the niche was observed in four and decrease of the niche in two. For 11 patients with duodenal ulcer, disappearance of the niche was observed in five and decrease of the niche in four. The least favorable result occurred with the patient having an anastomotic ulcer. The data pertaining to the counteraction of gastric hyperacidity are shown in Table 26. The effect was investigated by using the basal and histamine-stimulated gastric secretion methods. (J. B. Kirsner et al: *Gastroenterogy* Vol. 23, pages 199 – 218, 1953) Decrease of free acidity was observed in seven of nine cases tested by the basal gastric secretion method and in seven of eight cases tested by the histamine-stimulated gastric secretion method.

There was a minimum of such undesirable side effects as mydriasis, dryness of mouth, retention of urine, palpitation and constipation commonly associated with the administration of anti-cholinergic drugs. Although constipation appeared in two patients, pyrosis in two patients and fever in two patients, it was not necessary to discontinue administration of the drug and these symptoms spontaneously diminished.

Table 26

| Method | Increase | No change | Decrease |
|---|---|---|---|
| Basic secretion | 2 | 0 | 7 |
| Histamine secretion | 1 | 0 | 7 |

EXAMPLE 28

Clinical and pharmacological study

To two male patients and one female patient having gastric ulcer was administered orally dehydrocorydaline in a dose of 80 mg. per day (four times per day) for 1 month. Before and after the treatment, the alkali time by means of alkali test after giving sodium bicarbonate as a stimulant was measured by using pH telemetering capsule and compared each other.

As the results, there was observed a prolongation of the alkali time and an improvement in the gastric juice secretory pattern.

To other two male patients was administered orally dehydrocorydaline in a dose of 40 mg. or 60 mg. per day for 1 month and the stable pH level of gastric juice and the alkali time by means of alkali test were measured in the same manner as described above to result in a prolongation of the alkali time and an ascent of the stable pH level.

To another male patient was administered orally dehydrocorydaline in a dose of 40 mg. Then, the secretory volume of gastric juice and further the volume of hydrochloric acid and pepsin in gastric juice were inhibited.

EXAMPLE 29

Clinical studies were made covering 75 male patients and 32 female patients, a total of 107, ages ranging from 20 to 55 years. Of these, 88 patients had gastric ulcer, 14 duodenal ulcer, three anastomotic ulcer and two others. Dehydrocorydaline was administered orally in a dose of 30 – 120 mg. per day (three to four times per day). The period of treatment ranged from 7 to about 60 days.

The results in 97 patients having epigastric pain are shown in Table 27.

Table 27

| Diagnosis | Disappeared 1 | 2 | 3 | 4 weeks | Relieved | Non-relieved |
|---|---|---|---|---|---|---|
| Gastric ulcer | 39 | 17 | 3 | 2 | 2 | 20 |
| Duodenal ulcer | 3 | 2 | 2 | 1 | — | 3 |
| Anastomotic ulcer | 1 | — | 1 | — | — | 1 |

Table 24

| Symptom | Day of effective relief 1 | 2 | 3 | 4 | 5 | 6 | 7 | more than 7 days | Non-effective | Total |
|---|---|---|---|---|---|---|---|---|---|---|
| Pain | 2 | 2 | 2 | 3 | 1 | 0 | 4 | 1 | 2 | 17 |
| Epigastric fullness | 2 | 0 | 2 | 1 | 1 | 0 | 1 | 0 | 1 | 8 |
| Acidismus | 1 | 0 | 1 | 1 | 0 | 0 | 0 | 1 | 3 | 7 |
| Nausea, vomiting | 0 | 0 | 0 | 1 | 0 | 0 | 1 | 0 | 1 | 3 |

Table 25

| Diagnosis | Diminished | Decreased | Non-effective | Obscure |
|---|---|---|---|---|
| Gastric ulcer | 4 | 2 | 2 | 3 |
| Duodenal ulcer | 5 | 4 | 0 | 2 |

In 99 patients in which 86 patients had gastric ulcer and 13 patients had duodenal ulcer, ulcer niche was observed by roentgenogram examination. Of 52 patients, there was observed ulcer niche for 1 month and of 47 patients for 2 months or more. The results are shown in Table 28.

Table 28

| Diagnosis | Period of observing ulcer niche | | | | | |
|---|---|---|---|---|---|---|
| | Within one month | | | 2 months or more | | |
| | Healed | Improved | Non-improved | Healed | Improved | Non-improved |
| Gastric ulcer | 7 | 20 | 12 | 18 | 16 | 7 |
| Duodenal ulcer | 3 | 7 | 3 | 4 | 1 | 1 |

In 68 patients including 20 recurred patients, the effectiveness of dehydrocorydaline was observed, according to the location of ulcer. The results are shown in Table 29.

Table 29

| Location of ulcer | First occurrence | | Recurrence | |
|---|---|---|---|---|
| | Effective | Non-effective | Effective | Non-effective |
| Gastric angulas | 18 | 8 | 3 | 2 |
| Gastric corpus | 18 | 4 | 3 | 1 |
| Duodenum | — | — | 7 | 4 |

There was not observed any undesirable side effect in 94 patients, while constipation slightly appeared in nine patients, dryness of mouth in two patients, eruption in 1 patient and diarrhea in one patient.

Furthermore, laboratory data of liver function in 37 patients, blood picture in 14 patients, kidney function in four patients and physical examination in four patients were obtained. As the results, before and after the administration of dehydrocorydaline, there was not observed any abnormal symptom.

What is claimed is:

1. An anti-peptic ulcer active substance prepared by the process comprising (a) extracting a tuber of the genus Corydalis with a solvent selected from the group consisting of water, methanol, ethanol, propanol and mixtures thereof, (b) concentrating the resulting extract by vacuum distillation of solvent therefrom, (c) acidifying the concentrated extract to a pH of 1 to 4 by adding thereto acetic acid, tartaric acid, citric acid, hydrochloric acid, hydrobromic acid and sulfuric acid, (d) extracting the acidified aqueous solution of the extract with a hydrocarbon solvent selected from the group consisting of petroleum ether and petroleum benzin to remove the fatty substances therefrom, (e) raising the pH of the defatted aqueous acidic phase to 7.5 to 12 by adding thereto a base selected from the group consisting of ammonia, alkali metal hydroxide, alkali metal carbonate and alkali metal bicarbonate, (f) extracting the resulting aqueous alkaline solution with chloroform, dichloromethane, trichlomethane or carbon tetrachloride, separating the halohydrocarbon phase from the aqueous phase by vacuum distillation and recovering said active substance.

2. A process for preparation of an anti-peptic ulcer active substance which comprises extracting tubers of the genus Corydalis with a solvent selected from the group consisting of water, methanol, ethanol, propanol and mixtures thereof, concentrating the extract by distillation of solvent therefrom under subatmospheric pressure, acidifying the concentrated extract to a pH of 1 to 4 by addition thereto of a dilute acid selected from the group consisting of acetic acid, tartaric acid, citric acid, hydrochloric acid, hydrobromic acid and sulphuric acid, contacting the acidified extract with a hydrocarbon solvent selected from the group consisting of petroleum ether and petroleum benzin to remove fatty substances therefrom, raising the pH of the defatted extract to 7.5 – 12 by adding thereto ammonia, contacting the defatted alkaline solution with a halogenated hydrocarbon selected from the group consisting of chloroform, dichloromethane, trichloroethane and carbon tetrachloride to extract the active substance therefrom, separating the extract from the aqueous solution and distilling the resulting extract to remove the halogenated hydrocarbon solvent from the active substance, and recovering the active substance.

* * * * *